United States Patent
Hopfmann et al.

(10) Patent No.: US 7,358,286 B2
(45) Date of Patent: Apr. 15, 2008

(54) STABILIZER SYSTEM FOR STABILIZING PVC

(75) Inventors: Thomas Hopfmann, Lampertheim (DE); Hans-Helmut Friedrich, Lautertal-Gadernheim (DE); Karl-Josef Kuhn, Lautertal-Gadernheim (DE); Wolfgang Wehner, Zwingenberg (DE)

(73) Assignee: Chemtura Vinyl Additives GmbH, Lampertheim (DE)

( * ) Notice: Subject to any disclaimer, the term of this patent is extended or adjusted under 35 U.S.C. 154(b) by 381 days.

(21) Appl. No.: 10/542,562

(22) PCT Filed: Dec. 20, 2003

(86) PCT No.: PCT/EP03/14691

§ 371 (c)(1),
(2), (4) Date: Jul. 18, 2005

(87) PCT Pub. No.: WO2004/065470

PCT Pub. Date: Aug. 5, 2004

(65) Prior Publication Data

US 2006/0052497 A1    Mar. 9, 2006

(30) Foreign Application Priority Data

Jan. 17, 2003 (DE) ............................... 103 01 675

(51) Int. Cl.
*C08K 5/34* (2006.01)
(52) U.S. Cl. ...................................................... 524/100
(58) Field of Classification Search ................. 524/100
See application file for complete search history.

(56) References Cited

U.S. PATENT DOCUMENTS

| | | | |
|---|---|---|---|
| 6,194,494 B1 * | 2/2001 | Wehner et al. | 524/100 |
| 6,211,270 B1 | 4/2001 | Friedrich et al. | |
| 2005/0043451 A1 * | 2/2005 | Krainer et al. | 524/156 |

FOREIGN PATENT DOCUMENTS

| | | |
|---|---|---|
| EP | 1 046 668 | 10/2000 |
| WO | WO 02/48249 | 6/2002 |

* cited by examiner

*Primary Examiner*—Peter D. Mulcahy
(74) *Attorney, Agent, or Firm*—Daniel Reitenbach

(57) ABSTRACT

Disclosed are stabilizer mixtures comprising at least a) one alkanolamine or one reaction product of a monofunctional or polyfunctional epoxide and ammonia or a monofunctional or polyfunctional dialkyl(aryl)amine or monoalkyl(aryl)amine, and b) one uracil or one initial product and an optional perchlorate salt.

26 Claims, No Drawings

STABILIZER SYSTEM FOR STABILIZING PVC

BACKGROUND OF THE INVENTION

The invention relates to stabilizer mixtures, encompassing at least one alkanolamine, at least one uracil, and, if appropriate, one perchlorate salt, the mixtures being suitable for stabilizing chlorine-containing polymers.

There are many additives which can stabilize PVC. Compounds of the heavy metals lead, barium and cadmium are particularly well suited to this purpose, but are nowadays subject to criticism on environmental grounds or due to their heavy metal content (cf. "Plastics Additives Handbook", H. Zweifel, Carl Hanser Verlag, 5th edn., 2001, pp. 427-483 and "Kunststoff Handbuch PVC" [Plastics Handbook PVC], volume 2/1, W. Becker/D. Braun, Carl Hanser Verlag, 2nd edn., 1985, pages 531-538; and also Kirk-Othmer: "Encyclopedia of Chemical Technology", 4th ed., 1994, Vol. 12, Heat Stabilizers, pp. 1071-1091).

Processors and consumers are increasingly refusing to use these stabilizers.

Attempts therefore continue to find effective stabilizers and stabilizer mixtures which are free from lead, barium and cadmium. The intention here is also to provide a composition which has stabilizing action with respect to thermal and/or photochemical degradation and which, as a constituent of halogen-containing polymers, gives excellent initial color and also gives color stability.

A mixing specification matched to the processing method can be provided here, appropriate for the prevailing requirements, which may be based on health and safety at work, approval restrictions or process reliability. Surprisingly, this invention provides combinations of substances which are physiologically non-hazardous in plastics and which in some cases certainly do not provide satisfactory processing stability when used alone.

The applicant's specification WO 02/48249 A2 discloses compounds of the formula (I) in combination with at least one perchlorate salt. The comparative and inventive examples of this specification show that compounds of the general formula (I), used alone, do not contribute to acceptable initial color.

It has now been found that mixtures composed of a) at least one alkanolamine or one reaction product of a mono- or polyfunctional epoxide and of ammonia or of a mono- or polyfunctional dialkyl(aryl)- or monoalkyl(aryl)amine of the general formula (I), and of b) at least one uracil of the general formula (II) or, respectively, of their precursors of the general formula (III), and, if appropriate, one perchlorate salt, in particular a perchlorate of an alkali metal or of an alkaline earth metal, are particularly suitable for stabilizing chlorine-containing polymers, in particular PVC. The object set, to provide a stabilizer mixture complying with the requirements placed upon initial color, has been met via this novel combination. Further addition of a perchlorate salt, in particular a perchlorate of an alkali metal or of an alkaline earth metal, can improve the stabilization of chlorine-containing polymers, in particular PVC.

The use of other classes of amines alone without perchlorate does not give satisfactory processing stability, and in particular the initial color of the desired moldings does not differ substantially from that of an unstabilized specimen, the consequence therefore being that the requirements for good initial color and process reliability desired by processors are not met.

The β-hydroxyalkanolamines used in combination with the uracils of structure (II) or with their precursors of structure (III) can assume the function of improving initial color. This permits production of moldings with service properties complying with expectations over a prolonged period.

Surprisingly, synergistic action of the claimed combination, extending beyond the action of comparative mixing specifications comprising the individual components, has also been found in systems with perchlorate.

SUMMARY OF THE INVENTION

The present invention therefore provides stabilizer mixtures, encompassing at least
  a) one alkanolamine or/and one reaction product of a mono- or polyfunctional epoxide and of ammonia or of a mono- or polyfunctional dialkyl(aryl)- or monoalkyl(aryl)amine of the formula (I) and
  b) one uracil of the formula (II) or its precursor of the formula (III), and, if appropriate,
  c) one perchlorate salt.

For the alkanolamine of the formula (I) here

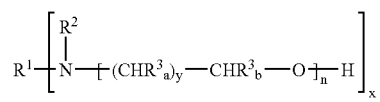

x=1, 2 or 3;
y=1, 2, 3, 4, 5 or 6;
n=from 1 to 10;
$R^1$ and $R^2$=independently of one another H, $C_1$-$C_{22}$-alkyl, —[—$(CHR^3{}_a)_y$—$CHR^3{}_b$—O—$]_n$—H, —[—$(CHR^3{}_a)_y$—$CHR^3{}_b$—O—$]_n$—CO—$R^4$, $C_2$-$C_{20}$-alkenyl, $C_2$-$C_{18}$-acyl, $C_4$-$C_8$-cycloalkyl, where this may have OH substitution in the β-position, $C_6$-$C_{10}$-aryl, $C_7$-$C_{10}$-alkaryl or $C_7$-$C_{10}$-aralkyl, or, if x=1, $R^1$ and $R^2$ may also, together with the N, form a closed ring having from 4 to 10 members, composed of carbon atoms and, where appropriate, of up to 2 heteroatoms, or if x=2, $R^1$ may also be $C_2$-$C_{18}$-alkylene which, at both β-carbon atoms, may have OH substitution and/or have interruption by one or more O atoms and/or by one or more $NR^2$ groups, or be dihydroxy-substituted tetrahydrodicyclopentadienylene, dihydroxy-substituted ethylcyclohexanylene, dihydroxy-substituted 4,4'-(bisphenol A dipropyl ether)ylene, isophoronylene, dimethylcyclohexanylene, dicyclohexylmethanylene or 3,3'-dimethyldicyclohexylmethanylene, and if x=3, $R^1$ may also be trihydroxy-substituted (tri-N-propyl isocyanurate)triyl;
$R^3{}_a$ and $R^3{}_b$=independently of one another $C_1$-$C_{22}$-alkyl, $C_2$-$C_6$-alkenyl, $C_6$-$C_{10}$-aryl, H or $CH_2$—X—$R^5$, where X=O, S, —O—CO— or —CO—O—;
$R^4$=$C_1$-$C_{18}$-alkyl/alkenyl or phenyl; and
$R^5$=H, $C_1$-$C_{22}$-alkyl, $C_2$-$C_{22}$-alkenyl or $C_6$-$C_{10}$-aryl.

DESCRIPTION OF THE PREFERRED EMBODIMENTS

The invention also provides stabilizer mixtures where the alkanolamine is a reaction product of a mono- or polyfunctional epoxide and of ammonia or of a mono- or polyfunctional dialkyl(aryl)- or monoalkyl(aryl)amine.

Examples of the alkanolamines of the general formula (I) are compounds where $R^1$ and $R^2$=methyl, ethyl, propyl, butyl, cyclohexyl, octyl, lauryl, tetradecyl, hexadecyl, stearyl, oleyl, allyl, phenyl or benzyl or hydroxyalkyl and $R^3$=H, methyl, ethyl, propyl or butyl. Preference is given to alkanolamines where $R^1$=lauryl, tetradecyl, hexadecyl, stearyl, or oleyl, where $R^2$=hydroxyalkyl. It is also possible to use ethoxylates and propoxylates of triethanol- and tri-isopropanolamine, and also of fatty amines of vegetable or animal origin. Preference is given to trialkanolamines and monoalkyl/alkenyldialkanolamines where $R^3$=H or methyl and y=1, in particular fatty amines which have been reacted twice with ethylene oxide or with propylene oxide. Other compounds with very good suitability can be found in the following list.

Methyl- or dimethylamine reacted once or twice with ethylene oxide or with propylene oxide.

Propyl- or dipropylamine reacted once or twice with ethylene oxide or with propylene oxide.

Isopropyl- or diisopropylamine reacted once or twice with ethylene oxide or with propylene oxide.

Butyl- or dibutylamine reacted once or twice with ethylene oxide or with propylene oxide.

Isobutyl- or diisobutylamine reacted once or twice with ethylene oxide or with propylene oxide.

Pentyl- or dipentylamine reacted once or twice with ethylene oxide or with propylene oxide.

Isopentyl- or diisopentylamine reacted once or twice with ethylene oxide or with propylene oxide.

Hexyl- or dihexylamine reacted once or twice with ethylene oxide or with propylene oxide.

Isohexyl- or diisohexylamine reacted once or twice with ethylene oxide or with propylene oxide.

Heptyl- or diheptylamine reacted once or twice with ethylene oxide or with propylene oxide.

Isoheptyl- or diisoheptylamine reacted once or twice with ethylene oxide or with propylene oxide.

Octyl- or dioctylamine reacted once or twice with ethylene oxide or with propylene oxide.

Isooctyl- or diisooctylamine reacted once or twice with ethylene oxide or with propylene oxide.

Nonyl- or dinonylamine reacted once or twice with ethylene oxide or with propylene oxide.

Isononyl- or diisononylamine reacted once or twice with ethylene oxide or with propylene oxide.

Decyl- or didecylamine reacted once or twice with ethylene oxide or with propylene oxide.

Isodecyl- or diisodecylamine reacted once or twice with ethylene oxide or with propylene oxide.

Undecyl- or diundecylamine reacted once or twice with ethylene oxide or with propylene oxide.

Isoundecyl- or diisoundecylamine reacted once or twice with ethylene oxide or with propylene oxide.

Dodecyl- or didodecylamine reacted once or twice with ethylene oxide or with propylene oxide.

Isododecyl- or dii-sododecylaamine reacted once or twice with ethylene oxide or with propylene oxide.

Tridecyl- or ditridecylamine reacted once or twice with ethylene oxide or with propylene oxide.

Isotridecyl- or diisotridecylamine reacted once or twice with ethylene oxide or with propylene oxide.

Tetradecyl- or ditetradecylamine reacted once or twice with ethylene oxide or with propylene oxide.

Hexadecyl- or dihexadecylamine reacted once or twice with ethylene oxide or with propylene oxide.

Octadecyl- or dioctadecylamine reacted once or twice with ethylene oxide or with propylene oxide.

Eicosyl- or dieicosylamine reacted once or twice with ethylene oxide or with propylene oxide.

Docosyl- or didocosylamine reacted once or twice with ethylene oxide or with propylene oxide.

N-Methylbutylamine reacted with ethylene oxide or with propylene oxide.

N-Ethylbutylamine reacted with ethylene oxide or with propylene oxide.

Allyl- or diallylamine reacted once or twice with ethylene oxide or with propylene oxide.

Crotyl- or dicrotylamine reacted once or twice with ethylene oxide or with propylene oxide.

Octadecenyl- or dioctadecenylamine reacted once or twice with ethylene oxide or with propylene oxide.

Benzyl- or dibenzylamine reacted once or twice with ethylene oxide or with propylene oxide.

Cyclohexyl- or dicyclohexylamine reacted once or twice with ethylene oxide or with propylene oxide.

N-Methylcyclohexylamine reacted with ethylene oxide or with propylene oxide.

N-Ethylcyclohexylamine reacted with ethylene oxide or with propylene oxide.

4-Vinyl-1-cyclohexene diepoxide reacted twice with diethanol- or diisopropanolamine.

Dicyclopentadiene diepoxide reacted twice with diethanol- or diisopropanolamine.

Bisphenol A diglycidyl ether reacted twice with diethanol- or diisopropanolamine.

Trisglycidyl isocyanurate reacted three times with diethanol- or diisopropanolamine.

Preference is given to trialkanolamines and monoalkyl/alkenyldialkanolamines where $R^3_a$ and $R^3_b$=independently of one another H or methyl and y=1.

The compounds of the general formula (I) where y=from 1 to 6, i.e. having up to 6 methylene groups between the amino group and the hydroxy-substituted carbon atom, have been found to be suitable for use as a PVC stabilizer in combination with a perchlorate salt.

According to the invention it is also possible to use compounds of the general formula (I) where x=2, i.e. compounds which have two hydroxyalkylamino groups per molecule. Examples of these are N,N,N',N'-tetrakis(2-hydroxyethyl)ethylenediamine, N,N,N',N'-tetrakis(2-hydroxy-1-propyl)ethylenediamine, N,N,N',N'-tetrakis(2-hydroxyethyl)propylenediamine and N,N,N',N'-tetrakis(2-hydroxy-1-propyl)-1propylenediamine and N,N,N',N'-tetrakis(2-hydroxyethyl)hexamethylenediamine, preference being given to four-fold reactions of 1,6-hexamethylene- or 1,8-octamethylenediamine or neopentanediamine with ethylene oxide or with propylene oxide, or analogous reactions of bisaminomethylcyclohexane or isophoronediamine or 4,4'-diaminodicyclohexylmethane or 3,3'-dimethyl-4,4'-diaminodicyclohexylmethane.

According to the invention, it is also possible to use compounds of the general formula (I) where x=3, i.e. those which have three hydroxyalkylamino groups per molecule. An example of these is a reaction product of trisglycidyl isocyanurate with mono- or diethanolamine or mono- or dipropanolamine.

The alkanolamines of the general formula (I) are chemicals which can be purchased or can be prepared by known methods via N-alkylation of an appropriate amine or ammonia (cf. Kirk-Othmer, Vol. 2, Alkanolamines).

Examples of the preferred alkanolamines of the general formula (I) are tris(2-hydroxyethyl)amine, tris(2-hydroxy-1-propyl)amine, bis(2-hydroxyethyl)-2-hydroxy-1-propylamine, N-n-butyl-N,N-bis(2-hydroxyethyl)amine, N,N-bis (n-butyl)-N-(2-hydroxyethyl)amine, N-(3-n-butyloxy-2-hydroxy-1-propyl)-N,N-bis(2-hydroxyethyl)amine, N-(1,3-dihydroxy-2-hydroxymethyl-2-propyl)-N,N-bis(2-hydroxyethyl)amine, N,N-bis-(2-hydroxyethyl)-N-palmitylamine, N,N-bis(2-hydroxyethyl)-N-oleylamine, N,N-bis(2-hydroxyethyl)-N-stearylamine, N,N-bis(2-hydroxyethyl)-N-stearylamine, N-(2-hydroxyethyl)morpholine and N-(2,3-dihydroxy-1-propyl)morpholine, bishydroxyethylpiperazine and bishydroxyisopropylpiperazine and reaction products of glycidyl ethers with mono- or dialkylamine or ammonia, and also the alkanolamines derived therefrom, for example ethanolamine, diethanolamine, n-propanolamine, isopropanolamine, n-dipropanolamine, or isodipropanolamine.

Very particular preference is given to adducts of olefin oxides, such as octene oxide, decene oxide, dodecene oxide, tetradecene oxide, hexadecene oxide, octadecene oxide, eicosene oxide and docosene oxide, and also epoxystearyl alcohol with diethanol- or diisopropanolamine. These compounds with an OH function in the β-position at both ends of a relatively long alkyl chain, for example N-(2-hydroxyhexadecyl)diethanolamine, N-(2-hydroxy-3-octyloxypropyl) diethanolamine, N-(2-hydroxy-3-decyloxypropyl)diethanolamine, N-(2-hydroxy-3-octyloxypropyl) diethanolamine and bis-N-(2-hydroxy-3-phenyloxypropyl) ethanolamine are a particularly suitable component in the stabilizer systems of the invention.

This list is given only by way of example and does not claim to be comprehensive.

The amounts to be used of the compounds of the formula (I) to achieve stabilization in chlorine-containing polymer are advantageously from 0.01 to 10% by weight, preferably from 0.05 to 5% by weight, in particular from 0.1 to 3% by weight.

The inventive composition comprises, alongside at least one representative of the alkanolamines of the structure (I), at least one representative of the uracils of the general structure (II). According to the invention, the group of the uracils is defined as that of the derivatives of structure (II) and also that of the cyanoacetylureas of the structure (III), which are precursors of the uracils.

Compounds of the formula (II) have previously been described in DE-A-1 694 873, EP-A-0 065 934, EP-A-0 041 479, and EP-A-0 768 336, and can be prepared by known methods in a process involving one or more steps.

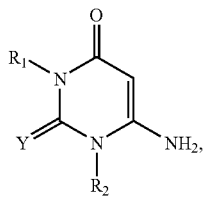

(II)

where
R1 and R2, independently of one another, are C1-C24-alkyl, which may have interruption by —$CO_2$— and/or by 1 or more oxygen atoms, and/or may have substitution by one or more OH groups, examples here being —$CH_2$—O—$CH_2$—$CH_2$—O—$CH_3$, —$CH_2$—O—$CH_2$—$CH_2$—$CH_2$—O—$CH_3$, —$CH_2$—O—$CH_2$—$CH_2$—$CH_2$—$CH_2$—O—$CH_3$, —$CH_2$—$CH_2$—O—$CH_2$—$CH_2$—O—$CH_3$, —$CH_2$—$CH_2$—O—$CH_2$—$CH_2$—O—$CH_2$—$CH_2$—O—$CH_2$—$CH_3$, etc. or are C3-C24-alkenyl, branched or unbranched, or are C5-C8-cycloalkyl, unsubstituted or substituted with from 1 to 3 C1-C4-alkyl, C1-C4-alkoxy, or C5-C8-cycloalkyl groups, or with hydroxy groups, or with Cl atoms, or are C7-C9-phenylalkyl, unsubstituted or substituted on the phenyl ring with from 1 to 3 C1-C4-alkyl, C1-C4-alkoxy, or C5-C8-cycloalkyl groups, or with hydroxy groups, or with Cl atoms, and R1 or R2 may also be hydrogen, and Y is S or O. For compounds of the formula (II) here:

examples of C1-C4-alkyl are methyl, ethyl, n-propyl, isopropyl, n-butyl, isobutyl, sec-butyl or tert-butyl. Preference is given to C1-C4-alkyl, if appropriate with interruption by —$CO_2$—.

Examples of C1-C24-alkyl other than the radicals just mentioned are pentyl, hexyl, heptyl, octyl, 2-ethylhexyl, isooctyl, decyl, nonyl, undecyl, dodecyl, tetradecyl, hexadecyl, octadecyl, eicosyl, docosyl or tetracosyl.

Examples of the alkenyl radicals are vinyl, allyl, methallyl, 1-butenyl or 1-hexenyl, 1-octenyl, 2-octenyl, decenyl, undecenyl, tetradecenyl, hexadecenyl, octadecenyl and eicosenyl, preferably allyl. The alkyl or alkenyl radicals may be branched or unbranched radicals.

Examples of C1-C4-alkoxy are methoxy, ethoxy, propoxy, isopropoxy, butoxy or isobutoxy.

Examples of C5-C8-cycloalkyl are cyclopentyl, cyclohexyl, cycloheptyl or cyclooctyl.

Examples of C7-C9-phenylalkyl are benzyl, 1- or 2-phenylethyl, 3-phenylpropyl, α,α-dimethylbenzyl or 2-phenylisopropyl, preferably benzyl.

If the cycloalkyl groups or the phenyl group of the phenylalkyl radicals have substitution, preference is then given to two or one substituent (s), particular preference among the substituents being given to chlorine, hydroxy, methyl or methoxy.

Examples of C3-C6-alkenyl are vinyl, allyl, methallyl, 1-butenyl or 1-hexenyl, preferably allyl.

If the alkyl radicals have interruption, they necessarily include at least 2 carbon atoms. —$CO_2$— here means a

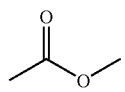

group.

Examples of C1-C22-alkyl radicals with interruption by —CO2— are branched or straight-chain radicals, e.g. methoxycarbonylmethyl, methoxycarbonylethyl, methoxycarbonylpropyl, methoxycarbonylbutyl, methoxycarbonylhexyl, methoxycarbonyloctyl, ethoxycarbonylmethyl, ethoxycarbonylethyl, ethoxycarbonylpropyl, ethoxycarbonylbutyl, ethoxycarbonylhexyl, ethoxycarbonyloctyl, n-propoxycarbonylmethyl, n-propoxycarbonylethyl, n-propoxycarbonylbutyl, n-propoxycarbonylhexyl, n-propoxycarbonyloctyl, isopropoxycarbonylmethyl, isopropoxycarbonylethyl, isopropoxycarbonylbutyl, isopropoxycarbonylhexyl, isopropoxycarbonyloctyl, n-butoxycarbonylmethyl, n-butoxycarbonylethyl, n-butoxycarbonylbutyl, n-butoxycarbonylhexyl or tert-butoxycarbonylmethyl. This list makes no claim to be comprehensive, but gives the structural principle, which is readily comprehensible to the person skilled in the art.

By way of example, methoxycarbonylethyl is preferred.

Preference is given here to compounds of the formula (II), where
R1 and R2, independently of one another, are C1-C18-alkyl and hydrogen.

It is particularly preferable either that R1 and R2 are identical and are methyl, ethyl, propyl, butyl, allyl or octyl, or that they are different and are ethyl and allyl.

If only one of the two substituents R1 or R2 is hydrogen, the carbon chain of the remaining radical is larger than C2, and the above then applies correspondingly to the possible further substitution pattern. R1 or R2 can therefore be C3-C24-alkyl, which may have interruption by —CO$_2$— and/or by 1 or more oxygen atoms, and/or may have substitution by one or more OH groups, or can be C3-C24-alkenyl, branched or unbranched, or can be C5-C8-cycloalkyl, unsubstituted or substituted with from 1 to 3 C1-C4-alkyl, C1-C4-alkoxy, or C5-C8-cycloalkyl groups, or with hydroxy groups, or with Cl atoms, or can be C7-C9-phenylalkyl, unsubstituted or substituted on the phenyl ring with from 1 to 3 C1-C4-alkyl, C1-C4-alkoxy, or C5-C8-cycloalkyl groups, or with hydroxy groups, or with Cl atoms. Preference is given to the monosubstituted, in the 1- or 3-position of the formula (II), alkyl, alkenyl or alkoxyalkyl derivatives where R1 or R2 is propyl or butyl or cyclohexyl or is C3-C6-alkyl interrupted by an oxygen atom. Examples of particularly preferred compounds are: 1-propyl-2-aminouracil, 1-propyl-4-aminouracil, 1-allyl-2-aminouracil, 1-allyl-4-aminouracil, 1-methoxyethyl-2-aminouracil, 1-methoxyethyl-4-aminouracil.

According to the invention, it is also possible to use the cyanoacetylureas (III), which are the synthetic precursors of the uracils, in combination with the structures of the formula (I). These are known to the person skilled in the art and are described in U.S. Pat. No. 2,598,936, and in the applicant's specification U.S. Pat. No. 6,211,270, and in J. Org. Chem. 16, 1897-1890 (1951), and can be prepared by known methods. The starting ureas are commercially available or can be prepared by known processes.

Cyanoacetylureas of the formula (III)

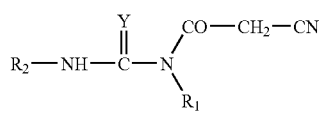

where
Y is oxygen or sulfur, and
R1 is C1-C24-alkyl, which may have interruption by —CO2— and/or by oxygen atoms, and/or may have substitution by from 1 to 3 OH groups, or is C3-C24-alkenyl, C7-C10-phenylalkyl, C5-C8-cycloalkyl, C7-C10-alkylphenyl, phenyl or naphthyl, where in each case the aromatic radical may have substitution by —OH, C1-C12-alkyl and/or OC1-C4-alkyl, and R2 is as defined for R1, or, if R1 is hydrogen then R2 can also be C3-C24-alkyl, which may have interruption by —CO2— and/or by oxygen atoms and/or may have substitution by from 1 to 3 OH groups, or can be C3-C24-alkenyl, C7-C10-phenylalkyl, C5-C8-cycloalkyl, C7-C10-alkylphenyl, phenyl or naphthyl, where in each case the aromatic radical may have substitution by —OH, by C1-C12-alkyl and/or by OC1-C4-alkyl, have particularly good suitability in the combination described according to the invention for stabilizing chlorine-containing polymers, e.g. PVC.

For compounds of the formula (III):
Examples of C1-C4-alkyl are methyl, ethyl, n-propyl, isopropyl, n-butyl, isobutyl, sec-butyl or tert-butyl. Examples of C$_1$-C24-alkyl, other than the radicals just mentioned, are pentyl, hexyl, heptyl, octyl, 2-ethylhexyl, isooctyl, decyl, nonyl, undecyl or dodecyl, and also tetradecyl, hexadecyl, octadecyl, eicosyl, docosyl or tetracosyl. Preference is given to C$_1$-C8-alkyl, if appropriate having interruption by —CO2—. Examples of C5-C8-cycloalkyl are cyclopentyl, cyclohexyl, cycloheptyl or cyclooctyl, preferably cyclohexyl.

Examples of C7-C10-alkylphenyl are tolyl or mesityl, in particular tolyl. Examples of C7-C10-phenylalkyl are benzyl, 1- or 2-phenylethyl, 3-phenylpropyl, α,α-dimethylbenzyl or 2-phenylisopropyl, preferably benzyl and 2-phenethyl, in particular benzyl.

If the aromatic radical has substitution, it preferably has three, two or in particular one substituent, and the substituents are in particular hydroxy, methyl, ethyl, methoxy or ethoxy.

Examples of C3-C8-alkenyl are allyl, methallyl, 1-butenyl, 1-hexenyl, 1-octenyl or 2-octenyl, preferably allyl.

If the alkyl radicals have interruption, they necessarily include at least 2 carbon atoms.
—CO$_2$— here is a

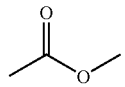

group.

Examples of alkyl radicals with interruption by —CO$_2$— can be found in the text associated with formula (II). Preference is given here to compounds of the formula (III) where
Y is oxygen, and also to those where the radicals R1 and R2 are identical. Other advantageous compounds are those where Y is sulfur.

Further preference is given to compounds of the formula (III) where R1 and R2 are C1-C8-alkyl, C3-C5-alkenyl, benzyl or 2-phenethyl.

Particular preference is given to compounds of the formula (III) where R1 and R2 are C$_1$-C4-alkyl, allyl or benzyl.

Examples which may be mentioned are N,N'-dimethyl-N-cyanoacetylurea, N,N'-diethyl-N-cyanoacetylurea, N,N'-dioctyl-N-cyanoacetylurea, etc. This list is given only by way of example and does not make any claim to be comprehensive.

Other preferred compounds here are those of the formula (III)
where
Y is oxygen, and also those where the radicals R1 and R2 differ from one another. In particular for R1=H. R2 is then C3-C12-alkyl which may have interruption by —CO$_2$— and/or by oxygen atoms, and/or may have substitution by from 1 to 3 OH groups, or is then C3-C12-alkenyl, C7-C10-phenylalkyl, C5-C8-cycloalkyl, C7-C10-alkylphenyl, phenyl or naphthyl, where in each case the aromatic radical may have substitution by —OH, by C1-C12-alkyl and/or by OC$_1$-C4-alkyl. Other advantageous compounds are those where Y is sulfur. Particular preference is given to compounds of the formula (III) where R1=H and R2=C3-C8-alkyl, methoxyethyl, allyl or benzyl.

It should expressly be mentioned here that the reaction of the cyanoacetylureas of the general formula (III) to give the corresponding uracils of the general formula (II) can take place even before preparation of the stabilizer has ended. This is known to the person skilled in the art from the literature and derives from the synthetic principle of preparation of uracils from cyanoacetylureas. By way of example, N,N'-dibutyl-N-cyanoacetylurea (formula (III): R1=R2=butyl) will react to give the analogous 1,3-dibutyl-4-aminouracil. Particularly if the matrix here comprises basic compounds. This precondition is moreover met merely by the other possible components of the matrix, e.g. commercially available calcium stearate or zeolite. In this context, the matrix in the selected inventive examples comprises the alkanolamine alone, or one or more compounds from the group of the plastics additives and plastics stabilizers and of the halogen-containing organic plastics. If the matrix comprises liquid constituents, this reaction is accelerated in accordance with the kinetics of chemical reactions.

Representatives of the general formula (I) which are liquid at room temperature or at processing temperature are particularly suitable for this purpose.

This reaction of the cyanoacetylurea to give the uracil is in particular also promoted by temperature increases brought about via mixing or processing, or brought about via the preparation of the stabilizer, and these may be spray processes or melting processes. It is not necessary for the reaction here to proceed to completion. The two species may be present alongside one another in various ratios. However, certain conditions can give practically quantitative conversion. There are no restrictions per se on the selection of the basic compounds for the reaction of the cyanoacetylurea intermediate to give the uracil. Suitable compounds are any of those whose aqueous or alcoholic extract reacts as a base, or which in any other way induce the reaction, examples being:

alkali metal hydroxides, alkaline earth metal hydroxides, zeolites, Alcamizer products or amines. The reaction may take place before the end of the process to prepare the stabilizer, or during the process of mixing the stabilizer components alone, or in the presence of the entire formulation, either in the mixer or in the subsequent course of processing.

The amount of the compounds of the formula (III) to be used to achieve stabilization in the chlorine-containing polymer is advantageously from 0.01 to 10% by weight, preferably from 0.05 to 5% by weight, in particular from 0.1 to 3% by weight.

The invention also provides combinations of the stabilizer mixtures encompassing at least alkanolamine or a reaction product of a mono- or polyfunctional epoxide and of ammonia or of a mono- or polyfunctional dialkyl(aryl)- or monoalkyl(aryl)amine of the formula (I) and uracils of the formula (II) or their precursors of the formula (III) encompassing at least one halogen-containing oxyacid, e.g. a perchlorate salt.

The perchlorate salts are known to the person skilled in the art, examples are those of the formula $M(ClO_4)n$, where M is Li, Na, K, Mg, Ca, Sr, Ba, Zn, Al, La, Ce, or a hydrotalcite layer-lattice cation, or an organic onium salt cation. The index n is 1, 2 or 3, as appropriate for the valency of M, or if a hydrotalcite layer-lattice cation is present $0<n\leq 1$.

These perchlorate salts may be used in various familiar supply forms; e.g. in the form of a salt or solution in water or in an organic solvent, as they stand, or absorbed onto a carrier material such as PVC, Ca silicate, zeolites or hydrotalcites. Examples are perchlorate salts dissolved or complexed using alcohols (polyols, cyclodextrins) or using ether alcohols or ester alcohols or crown ethers or plasticizers. Partial esters of the polyols are to be regarded as ester alcohols here. In the case of polyhydric alcohols or polyols it is also possible to use their dimers, trimers, oligomers and polymers, examples being di-, tri-, tetra- and polyglycols, and also di-, tri- and tetrapentaerythritol or polyvinyl alcohol in various degrees of polymerization. Other solvents which may be used are phosphate esters, and also cyclic and acyclic carbonic esters. Other embodiments are described in EP 0 394 547, EP 0 457 471 and WO 94/24200. Depending on the carrier material used or process for application to the carrier, the structure of the perchlorate salts may be either amorphous or else semicrystalline or crystalline. The person skilled in the art is also aware of mixtures of the various states of aggregation.

It is preferable to use sodium/potassium perchlorate salts.

Examples of the amount of the perchlorates that can be used are from 0.001 to 5 parts by weight, advantageously from 0.01 to 3 parts by weight, particularly preferably from 0.01 to 2 parts by weight, based on 100 parts by weight of PVC.

The use of ethanolammonium perchlorate salts for inhibiting discoloration of chlorine-containing resin is disclosed in JP-A 61-9451. These are perchlorate salts with ammonium-salt structure, which can be obtained via addition of primary, secondary or tertiary ethanolamines to a perchloric acid solution. Ammonium perchlorate salts are generally compounds sensitive to heat and shock and therefore create a certain risk of explosion, making them unsuitable for industrial applications.

The invention also provides combinations of the stabilizer mixtures composed of at least one alkanolamine or of a reaction product of a mono- or polyfunctional epoxide and of ammonia or of a mono- or polyfunctional dialkyl(aryl)- or monoalkyl(aryl)amine of the formula (I) and of uracils of the formula (II) or of their precursors of the formula (III) with at least one other conventional additive or conventional stabilizer.

The invention also provides combinations of the stabilizer mixtures composed of at least one alkanolamine or one reaction product of a mono- or polyfunctional epoxide and of ammonia or of a mono- or polyfunctional dialkyl(aryl)- or monoalkyl(aryl)amine of the formula (I) and of uracils of the formula (II) or of their precursors of the formula (III) with at least one perchlorate salt and with at least one other conventional additive or conventional stabilizer.

The inventive compositions may therefore also have been treated with other conventional additives, such as polyols and disaccharide alcohols, hydroxycarboxylic acids or their salts, glycidyl compounds, hydrotalcites, zeolites (aluminosilicates of alkali metals or alkaline earth metals), compounds from the group of the calcium aluminum hydroxides or their hydrates, compounds from the group of the calcium aluminum hydroxohydrogenphosphites or their hydrates, compounds from the group of the aluminum hydroxides or their hydrates, compounds from the group of the calcium aluminum hydroxo(hydrogen)carbonates or their hydrates, compounds from the group of the lithium layer-lattice compounds or their hydrates, fillers, metal soaps, alkali metal compounds and alkaline earth metal compounds, fillers/pigments, lubricants, plasticizers, phosphites, pigments, epoxidized fatty acid esters and other epoxy compounds, flame retardants, antioxidants, UV absorbers, gelling agents, compatibilizers, antistatic agents, antifogging agents, light stabilizers, optical brighteners and blowing agents. Particular preference is given to epoxidized soy oils, alkaline earth metal soaps or aluminum soaps and phosphites.

Examples of these additional components are listed and explained at a later stage below (cf. "Handbook of PVC Formulating" by E. J. Wickson, John Wiley & Sons, New York 1993).

Stabilization of chlorine-containing polymers, in particular PVC, by means of hydrocalumites, catoites and calcium aluminum hydroxohydrogenphosphites is disclosed in WO 92/13914, WO 93/25613, DE 3 941 902 and DE 4 106 411. The compounds from the group of the calcium aluminum hydroxides or their hydrates are generally described in "Ullmann's Encyclopedia of Industrial Chemistry" (5th edition, 1986): Vol. A5—Cement and Concrete (pp. 505 et seq.); Kirk-Othmer "Encyclopedia of Chemical Technology" (4th edition, 1993): Vol. 5—Cement (pp. 572 et seq.); P. Barnes "Structure and Performance of Cements" (Appl. Sci. Publ. N. Y., 1983); F. M. Lea "The Chemistry of Cement and Concrete" (E. Arnold Publ. London, 1971); H. F. W. Taylor "Cement Chemistry" (Acad. Press, London, 1992)—chapter 6: Hydrated aluminate phases (pp. 167 et seq.).

The stabilizing action of lithium layer-lattice compounds on the PVC is described by way of example in EP-A-0 761 756 and in DE-A-4 425 275. All of these compounds may have been surface-modified, if desired.

Polyols and Disaccharide Alcohols

Examples of compounds of this type which may be used are: pentaerythritol, dipentaerythritol, tripentaerythritol, trimethylolethane, bistrimethylolpropane, inositol (cyclitols), polyvinyl alcohol, bistrimethylolethane, trimethylolpropane, sorbitol (hexitols), maltitol, isomaltitol, cellobiitol, lactitol, Lycasin, mannitol, lactose, leucrose, tris(hydroxyethyl) isocyanurate, tris(hydroxypropyl) isocyanurate, Palatinitol, tetramethylolcyclohexanol, tetramethylolcyclopentanol, tetramethylolcyclopyranol, xylitol, arabinitol (pentitols), tetritols, glycerol, diglycerol, polyglycerol, thiodiglycerol or 1-0-α-D-glycopyranosyl-D-mannitol dihydrate. Among these, preference is given to the disaccharide alcohols. It is also possible to use polyol syrups, such as sorbitol syrup, mannitol syrup and maltitol syrup.

Examples of the amount which may be used of the polyols are from 0.01 to 20 parts by weight, advantageously from 0.1 to 20 parts by weight and in particular from 0.1 to 10 parts by weight, based on 100 parts by weight of PVC.

Hydroxycarboxylic Acids

Use may be made of salts or mixtures of salts of hydroxycarboxylic acids having fewer than 4 hydroxy groups and fewer than 10 carbon atoms. Among these are compounds listed in detail in the patent application WO 02/06389. Compounds having one or two hydroxy groups have proven particularly effective. Other substitution patterns may be present, examples being aldehyde, keto, acyl, amino, aminoalkyl, aminoaryl and/or halide substituents. If the compound bears two or more acid functions, at least one of these is in salt form. The salts are preferably those selected from the group Li, K, Na, Ca, Mg, Ba, Sr, Al, Fe, La, Ce, Mn or zinc. Preference, depending on the application, is particularly given to the salts of lactic acid, e.g. sodium lactate, or salts of citric acid.

Glycidyl Compounds

They contain the glycidyl group

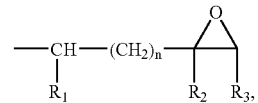

bonded directly to carbon, to oxygen atoms, to nitrogen atoms or to sulfur atoms, where either $R_1$ and $R_3$ are both hydrogen, $R_2$ is hydrogen or methyl and n=0 or $R_1$ and $R_3$ together are —CH$_2$—CH$_2$— or —CH$_2$—CH$_2$—CH$_2$—, $R_2$ is then hydrogen and n=0 or 1.

It is preferable to use glycidyl compounds having two functional groups. However, it is also possible in principle to use glycidyl compounds having one, three or more functional groups.

Diglycidyl compounds having aromatic groups are mainly used. The amount preferably used of the terminal epoxy compounds is at least 0.1 part, for example from 0.1 to 50 parts by weight, advantageously from 1 to 30 parts by weight and in particular from 1 to 25 parts by weight, based on 100 parts by weight of PVC.

Hydrotalcites

The chemical composition of these compounds is known to the person skilled in the art, e.g. from the patents DE 3 843 581, U.S. Pat. No. 4,000,100, EP 0 062 813 and WO 93/20135.

Compounds from the hydrotalcite series may be described by the following general formula $$M^{2+}_{1-x}M^{3+}_x(OH)_2(A^{b-})_{x/b}\cdot d\ H_2O,$$

where
$M^{2+}$=one or more of the metals selected from the group consisting of Mg, Ca, Sr, Zn and Sn
$M^{3+}$=Al or B,
$A^n$ is an anion of valency n, b is a number from 1 to 2, 0<x0.5,
m is a number from 0 to 20.
Preference is given to compounds with
$A^n$=OH$^-$, ClO$_4^-$, HCO$_3^-$, CH$_3$COO$^-$, C$_6$H$_5$COO$^-$, CO$_3^{2-}$, (CHOHCOO)$_2^{2-}$, (CH$_2$COO)$_2^{2-}$, CH$_3$CHOHCOO$^-$, HPO$_3^-$ or HPO$_4^{2-}$.

Examples of hydrotalcites are Al$_2$O$_3$.6MgO.CO$_2$.12H$_2$O (i), Mg$_{4.5}$Al$_2$(OH)$_{13}$.CO$_3$.3.5H$_2$O (ii), 4MgO.Al$_2$O$_3$.CO$_2$.9H$_2$O (iii), 4MgO.Al$_2$O$_3$.CO$_2$.6H$_2$O, ZnO.3MgO.Al$_2$O$_3$.CO$_2$.8-9H$_2$O and ZnO.3MgO. Al$_2$O$_3$.CO$_2$.5-6H$_2$O. Types i, ii and iii are very particularly preferred.

Zeolites (Aluminosilicates of Alkali Metals and/or of Alkaline Earth Metals)

These may be described by the following general formula $M_{x/n}[(AlO_2)_x(SiO_2)_y]\cdot wH_2O$, where n is the charge on the cation M;

M is an element of the first or second main group, such as Li, Na, K, Mg, Ca, Sr or Ba;
y: x is a number from 0.8 to 15, preferably from 0.8 to 1.2; and
w is a number from 0 to 300, preferably from 0.5 to 30.
Examples of zeolites are sodium aluminosilicates of the formulae
Na$_{12}$Al$_{12}$Si$_{12}$O$_{48}$.27 H$_2$O [zeolite A], Na$_6$Al$_6$Si$_6$O$_{24}$.2NaX.7.5H$_2$O, X=OH, halogen, ClO$_4$ [sodalite]; $Na_6Al_6Si_{30}O_{72} \cdot 24\, H_2O$; $Na_8Al_8Si_{40}O_{96} \cdot 24\, H_2O$; $Na_{16}Al_{16}Si_{24}O_{80} \cdot 16\, H_2O$; $Na_{16}Al_{16}Si_{32}O_{96} \cdot 16\, H_2O$; $Na_{56}Al_{56}Si_{136}O_{384} \cdot 250\, H_2O$ [zeolite Y], $Na_{86}Al_{86}Si_{106}O_{384} \cdot 264\, H_2O$ [zeolite X];

or the zeolites which can be prepared by partial or complete exchange of the Na atoms by Li atoms, K atoms, Mg atoms, Ca atoms, Sr atoms or Zn atoms, for example $(Na, K)_{10}Al_{10}Si_{22}O_{64} \cdot 20\, H_2O$; $Ca_{4.5}Na_3[(AlO_2)_{12}(SiO_2)_{12}] \cdot 30\, H_2O$; $K_9Na_3[(AlO_2)_{12}(SiO_2)_{12}] \cdot 27\, H_2O$.

Very particular preference is given to Na zeolite A and Na zeolite P.

The hydrotalcites and/or zeolites may be used in amounts of, for example, 0.1 to 20 parts by weight, expediently 0.1 to 10 parts by weight and in particular 0.1 to 5 parts by weight, based on 100 parts by weight of halogen-containing polymer.

Katoites

Compounds suitable for the inventive stabilizer combinations from the group of the katoites can be described by the general formula $$Ca_3Al_2(OH)_{12} \cdot mH_2O,$$

where m=0-10.

The compounds mentioned may, if appropriate, have been surface-modified. They have a very particular crystal lattice, (known as hydrogarnet structure), which distinguishes them from other calcium aluminum hydroxy compounds.

This crystal lattice, together with lattice separations, is described in the article by C. Cohen-Addad and P. Ducros in Acta Cryst. (1967), 23, pages 220 to 225. By way of example, these materials may be prepared by a method based on German patent specification DE 2 424 763.

Hydrocalumites

Compounds suitable for the inventive stabilizer combinations and derived from the group of the hydrocalumites are described by the general formula:

$$Ca_xAl\,(OH)_{2x+3} \cdot mH_2O,$$

where x=1 to 4 and m=from 0 to 8.

Preferred compounds are those where, in the above general formula, x=2 or 3.

Calcium Aluminum Hydroxy(Hydrogen)Phosphites

Suitable compounds from the group of the basic CHAPs, calcium aluminum hydroxyhydrogenphosphites, have the general formula $$Ca_xAl_2(OH)_{2(x+2)}HPO_3 \bullet mH_2O, \text{ where}$$

$x =$ from 2 to 8 and $m =$ from 0 to 12, or $$Ca_xAl_2(OH)_{2(x+3-y)}(HPO_3)_y \bullet mH_2O, \text{ where}$$

$x =$ from 2 to 12, $\dfrac{2x+5}{2} > y > 0$ and $m =$ from 0 to 12, with the exception $y = 1$, if $x =$ from 2 to 8.

Other examples of the hydrocalumites which via variation of the metal cation M and of the acid anions A or B of the general formula below $$M^{2+}{}_{(2+x)}Al^{3+}{}_{(1+y)}(OH)_{(6+z)}A^{j-}{}_a[B_r]^{n/*}mH_2O$$

and are described in detail in patent specification WO 02/098964, pages 18-20. In one preferred embodiment, M is calcium, which may be present in a mixture with magnesium or zinc or magnesium and zinc. For the purposes of the preferred embodiment, the composition is selected to be free from the heavy metal zinc. If a surface treatment is desired, the product may be modified accordingly using the methods and reagents known to the person skilled in the art.

Lithium Layer-lattice Compounds

Lithium aluminum layer-lattice compounds have the general formula A $$Li_aMII_{(b-2a)}Al_{(2+a)}OH_{(4+2b)}An^{-2/n} \cdot mH_2O$$

where

MII is Mg, Ca or Zn and

An⁻ is a selected anion of valency n or a mixture of anions and the indices are in the range $0 < a < (b-2)/2$, $1 < b < 6$ and m=from 0 to 30 with the proviso that b-2a>2 or the general formula B $$[Al_2(Li_{(1-x)} \cdot MII_x)(OH)_6]n\,(An^-)_{1+x}mH_2O$$

where

MII, A, m and n are as defined above and x complies with the condition $0.01 \leq x < 1$.

The preparation of the layer-lattice compounds mentioned is characterized by reacting lithium hydroxide, lithium oxide and/or its compounds capable of conversion to hydroxide, metal(II) hydroxides, metal(II) oxides and/or their compounds derived from the metals mentioned and capable of conversion to hydroxides, and aluminum hydroxides and/or their compounds capable of conversion to hydroxides, and also acids and/or their salts or mixtures thereof with one another in an aqueous medium, at a pH of from 8 to 10 and at temperatures of from 20 to 250° C., and isolating the resultant solid product of the reaction. The reaction time is preferably 0.5 to 40 hours, in particular from 3 to 15 hours.

The product directly produced from the reaction described above can be isolated from the aqueous reaction medium by known processes, preferably via filtration. The product isolated from the reaction is also worked up in a manner known per se, for example via washing of the filter cake with water and drying of the washed residue at temperatures of, for example, from 60 to 150° C., preferably at from 90 to 120° C. For the reaction with aluminum it is possible to use either fine-particle, activated metal(III) hydroxide in combination with sodium hydroxide or to use an $NaAlO_2$. Lithium, or one of the metal(II) compounds mentioned, may be used in the form of fine-particle lithium oxide or fine-particle lithium hydroxide, or a mixture thereof, or in the form of fine-particle metal(II) oxide or fine-particle metal(II) hydroxide or a mixture thereof. The corresponding acid anions may be used at various concentrations, e.g. directly in the form of acid or else in the form of salt.

The reaction temperatures are preferably from about 20 to 250° C., more particularly from about 60 to 180° C. Catalysts or accelerators are not required. The water of crystallization of the substances may be removed entirely or partially by heating.

In their use as stabilizers, the dried layer-lattice compounds do not evolve water or any other gas at the usual processing temperatures of from 160 to 220° C. for PVC, and therefore no blistering defects occur in the moldings.

The anion An in the above general formula can be sulfate, sulfite, sulfide, thiosulfate, peroxide, peroxosulfate, peroxodisulfate, hydrogenphosphate, hydrogenphosphite, carbonate, halides, nitrate, nitrite, hydrogensulfate, hydrogencarbonate, hydrogensulfite, hydrogensulfide, dihydrogenphosphate, dihydrogenphosphite, monocarboxylic anions, such as acetate and benzoate, amide, azide, hydroxide, hydroxylamine, hydroazide, acetylacetonate, phenolate, pseudohalides, halites, halates, perhalates, periodate, permanganate, dianions of dicarboxylic acids, e.g. phthalate, oxalate, maleate or fumarate, bisphenolates, phosphate, pyrophosphate, phosphite, pyrophosphite, trianions of tricarboxylic acids, e.g. citrate, trisphenolates, and many others, or else a mixture thereof. Among these, preference is given to hydroxide, carbonate, phosphite and maleate.

To improve the dispersibility of the substances in halogen-containing thermoplastic polymer compositions, these may be surface-treated with a higher fatty acid, e.g. stearic acid, with an anionic surfactant, with a silane coupling agent, with a titanate coupling agent, or with a glycerol ester of a fatty acid.

The calcium aluminum hydroxides, calcium aluminum hydroxohydrogenphosphites, aluminum hydroxides, calcium aluminum hydroxo (hydrogen) carbonates and lithium layer-lattice compounds described above may be nbt only crystalline but also semicrystalline and/or amorphous.

Fillers

Fillers such as calcium carbonate, dolomite, wollastonite, magnesium oxide, magnesium hydroxide, silicates, china clay, talc, glass fibers, glass beads, wood flour, mica, metal oxides or metal hydroxides, carbon black, graphite, rock flour, heavy spar, glass fibers, talc, kaolin and chalk are used. Preference is given to chalk (HANDBOOK OF PVC FORMULATING E. J. Wickson, John Wiley & Sons, Inc., 1993, pp. 393-449) and reinforcing agents (TASCHENBUCH der Kunststoff-additive [Plastics Additives Handbook], R. Gächter & H. Müller, Carl Hanser, 1990, pp. 549-615).

The fillers may be used in amounts of preferably at least one part by weight, for example 5 to 200 parts by weight, expediently 10 to 150 parts by weight and in particular from 15 to 100 parts by weight, based on 100 parts by weight of PVC.

Metal Soaps

Metal soaps are primarily metal carboxylates, preferably of relatively long-chain carboxylic acids. Well-known examples of these are stearates and laurates, and also oleates and salts of relatively short-chain aliphatic or aromatic alkanecarboxylic acids, such as acetic acid, propionic acid, butyric acid, valeric acid, hexanoic acid, sorbic acid; oxalic acid, malonic acid, succinic acid, glutaric acid, adipic acid, fumaric acid, citric acid, benzoic acid, salicylic acid, phthalic acids, hemimellitic acid, trimellitic acid, pyromellitic acid.

Metals which should be mentioned are: Li, Na, K, Mg, Ca, Sr, Ba, Zn, Al, La, Ce and rare earth metals. Use is frequently made of so-called synergistic mixtures, such as barium zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq. Besides the compounds mentioned, use may also be made of organoaluminum compounds, and of compounds analogous to the abovementioned compounds, in particular aluminum tristearate, aluminum distearate, and aluminum monostearate, and also aluminum acetate and basic derivatives derived therefrom.

U.S. Pat. No. 4,060,512 and U.S. Pat. No. 3,243,394 give further explanations concerning the aluminum compounds which can be used and those which are preferred.

Besides the abovementioned compounds, use may also be made of organic rare earth compounds, in particular compounds analogous to the abovementioned compounds. The term rare earth compound means particularly compounds of the elements cerium, praseodymium, neodymium, samarium, europium, gadolinium, terbium, dysprosium, holmium, erbium, thulium, ytterbium, lutetium, lanthanum and yttrium, particular preference being given to mixtures with cerium. Other preferred rare earth compounds are found in EP-A-0 108 023. Examples of the amount of the metal soaps or their mixtures which may be used are from 0.001 to 10 parts by weight, advantageously from 0.01 to 8 parts by weight, particularly preferably from 0.05 to 5 parts by weight, based on 100 parts by weight of PVC.

Compounds of Alkali Metals and of Alkaline Earth Metals

For the purposes of the present invention, these are mainly the carboxylates of the acids described above, but also corresponding oxides or, respectively, hydroxides or carbonates. Mixtures of these with organic acids are also possible. Examples are LiOH, NaOH, KOH, CaO, $Ca(OH)_2$, MgO, $Mg(OH)_2$, $Sr(OH)_2$, $Al(OH)_3$, $CaCO_3$ and $MgCO_3$ (and also basic carbonates, such as magnesia alba and huntite), and also fatty-acid salts of Na and of K. In the case of alkaline earth metal carboxylates and Zn carboxylates it is also possible to use adducts of these with MO or $M(OH)_2$ (M=Ca, Mg, Sr or Zn), so-called "overbased" compounds. In addition to the stabilizers according to the invention it is preferable to use alkali metal carboxylates, alkaline earth metal carboxylates and/or aluminum carboxylates.

Lubricants

Examples of possible lubricants are: montan wax, fatty acid esters, (ox.) polyethylene waxes, polypropylene waxes, (ox.) paraffin waxes, amide waxes, chloroparaffins, glycerol esters and alkaline earth metal soaps, and fatty ketones, and also the lubricants, or combinations of the lubricants, listed in EP 0 259 783, based on complex esters. Other lubricants which may be used are mentioned in "Plastics Additives Handbook", Carl Hanser Verlag, 5th edition, 2001, pages 511-552.

Plasticizers

Examples of organic plasticizers are those from the following groups:

A) Phthalates: such as preferably di-2-ethylhexyl, diisononyl and diisodecyl phthalate, also known by the common abbreviations DOP (dioctyl phthalate, di-2-ethylhexylphthalate), DINP (diisononyl phthalate), DIDP (diisodecyl phthalate).

B) Esters of aliphatic dicarboxylic acids, in particular esters of adipic, azelaic, and sebacic acid: preferably di-2-ethylhexyl adipate and diisooctyl adipate.

C) Trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$- alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers: by way of example here, mention may be made of epoxidized unsaturated fatty acids, e.g. epoxidized soybean oil, epoxidized linseed oil, epoxidized sunflower oil, epoxidized rapeseed oil, epoxidized tallow oil, epoxidized olive oil. Other epoxidized fatty acid esters which may be mentioned are the variants based on the monoesters of fatty acids and on monohydric alcohols, disclosed in WO 02/060884 A1. Other variants of epoxidized fatty acid esters are produced via transesterification of, for example, triacetin, described in DE-A-30 04 660. Among these are the epoxidized glyceride acetates, obtainable by transesterifying epoxidized fatty acid esters with triacetin. The molar ratio here can be selected so that, if desired, the appropriate diglyceride monoacetates are quantitatively predominant. Detailed examples and processes are disclosed in patent specification WO 02/060884 A1. The preparation of other derivatives, such as the monoglyceride diacetates, is also disclosed in US-A2-895 966. All of the mixtures as described actually mostly comprise complex mixtures derived from the transesterification reactions.

E) Polymeric plasticizers: the commonest starting materials for preparing polyester plasticizers are: dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.

F) Phosphoric esters: a definition of these esters is given in the abovementioned "Taschenbuch der Kunststoffadditive" ["Plasics Additives Handbook"], Chapter 5.9.5, pp. 408-412. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tris(2-ethylhexyl) phosphate and Reofos® 50 and 95 (Ciba Spezialitätenchemie).

G) Chlorinated hydrocarbons (paraffins)

H) Hydrocarbons

I) Monoesters, e.g. butyl oleate, phenoxyethyl oleate, tetrahydrofurfuryl oleate and alkylsulfonates.

J) Glycol esters, e.g. diglycol benzoates.

K) Representatives of citric acid plasticizers Among these are the citric esters of the general formula B, derived from 2-hydroxy-1,2,3-propanetricarboxylic acid as described in WO 02/094927

   B where
each R is a straight-chain or branched alkyl radical having from 4 to 18 carbon atoms and R1=H, or R1=R2CO. If R1 is not H, R2 is a straight-chain or branched alkyl radical having from 1 to 10 carbon atoms. Preferred alcohol components R used in the citric ester are C6-C14 alkanols, which may be branched or unbranched, and the alkanol radicals here may be identical or different.

Compounds which may be listed as non-restricting examples are triethyl citrate (Citrofol A I), tributyl citrate (Citrofol B I), triethyl acetylcitrate (Citrofol A II), tributyl acetylcitrate (Citrofol B II), tri-n-hexyl acetylcitrate, tri-n-hexyl n-butyryl-citrate, tri-n-(hexyl/octyl/decyl) acetylcitrate and tri-n-(octyl/decyl) acetylcitrate.

L) Perhydrophthalic, perhydraisophthalic and perhydroterepihthalic esters, and also perhydrogenated glycol benzoate and perhydrogenated diglycol benzoate esters. Preference is given to perhydrogenated diisononyl phthalate (®Hexamoll DINCH—BASF) as described in DE 19.756.913, DE 19.927.977, DE 19.927.978 and DE 19.927.979.

A definition of these plasticizers and examples of the same are given in "Kunststoffadditive" ["Plastics Additives"], R. Gächter/H. Müller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170. It is also possible to use mixtures of different plasticizers.

Examples of the amount which may be used of the plasticizers are 5 to 20 parts by weight, expediently 10 to 20 parts by weight, based on 100 parts by weight of PVC. Rigid or semirigid PVC preferably comprises up to 10%, particularly preferably up to 5%, of plasticizer, or no plasticizer.

Pigments

Suitable substances are known to the person skilled in the art. Examples of inorganic pigments are $TiO_2$, pigments based on zirconium oxide, $BaSO_4$, zinc oxide (zinc white) and lithopones (zinc sulfide/barium sulfate), carbon black, carbon black-titanium dioxide mixtures, iron oxide pigments, $Sb_2O_3$, $(Ti,Ba,Sb)O_2$, $Cr_2O_3$, spinels, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments and anthraquinone pigments. $TiO_2$ in micronized form is also preferred. A definition and further descriptions are found in the "Handbook of PVC Formulating", E. J. Wickson, John Wiley & Sons, New York, 1-993.

Phosphites

Organic phosphites are known costabilizers for chlorine-containing polymers. Examples are trioctyl, tridecyl, tridodecyl, tritridecyl, tripentadecyl, trioleyl, tristearyl, triphenyl, tricresyl, trisnonyl-phenol, tris-2,4-tert-butylphenyl or tricyclohexyl phosphite.

Other suitable phosphites are various mixtures of aryl dialkyl or alkyl diaryl phosphites, e.g. phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl and dodecyl bis-2,4-di-tert-butylphenyl phosphite.

It is also advantageous to use phosphites of various di- or polyols: examples are tetraphenyl dipropylene glycol diphosphite, polydipropylene glycol phenyl phosphite, tetramethylolcyclohexanol decyl diphosphite, tetramethylolcyclohexanol butoxyethoxyethyl diphosphite, tetramethylolcyclohexanol nonylphenyl diphosphite, bisnonylphenyl ditrimethylolpropane diphosphite, bis-2-butoxyethyl ditrimethylolpropane diphosphite, trishydroxyethyl isocyanurate hexadecyl triphosphite, didecyl pentaerythrityl diphosphite, distearyl pentaerythrityl diphosphite, bis-2,4-di-tert-butylphenyl pentaerythrityl diphosphite, and also mixtures of these phosphites and aryl/alkyl phosphite mixtures of empirical composition $(H_{19}C_9C_6H_4)O_{1.5}P(OC_{12, 13}H_{25, 27})_{1.5}$ or $[C_8H_{17}—C_6H_4—O—]_2P[i-C_8H_{17}O]$, $(H_{19}C_9C_6H_4)O_{1.5}P(OC_{9, 11}H_{19, 23})_{1.5}$.

An example of the amount which may be used of the organic phosphites is from 0.01 to 10 parts by weight, advantageously from 0.05 to 5 parts by weight, and in particular from 0.1 to 3 parts by weight, based on 100 parts by weight of PVC.

Epoxidized Fatty Acid Esters and other Epoxy Compounds

The inventive stabilizer combination may also preferably comprise at least one epoxidized fatty acid ester. Esters of fatty acids from natural sources (fatty acid glycerides) may especially be used here, examples being soy oil or rapeseed oil. However, it is also possible to use synthetic products, such as epoxidized butyl oleate. It is also possible to use epoxidized polybutadiene and polyisoprene, if appropriate also in partially hydroxylated form, or glycidyl acrylate and glycidyl methacrylate in the form of homo- or copolymer. These epoxy compounds may also have been applied to an alumino salt compound; in this connection see also DE-A-4 031 818.

Antioxidants

Alkylated monophenols, e.g. 2,6-di-tert-butyl-4-methylphenol, alkylthiomethylphenols, e.g. 2,4-dioctylthio-methyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetra-tert-butyl-4,4'-di-hydroxydibenzyl ether, hydroxybenzylated malonates, e.g. dioctadecyl 2,2-bis(3,5-di-tert-butyl-2-hydroxy-benzyl)malonate, hydroxybenzylaromatics, e.g. 1,3,5-tris(3,5-di-tert-butyl-4-hydroxybenzyl)-2,4,6-tri-methylbenzene, triazine compounds, e.g. 2,4-bisoctyl-mercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, acyl-aminophenols, e.g. 4-hydroxylauranilide, esters of beta-(3,5-di-tert-butyl-4-hydroxyphenyl) propionic acid, of beta-(5-tert-butyl-4-hydroxy-3-methylphenyl)-propionic acid, of beta-(3,5-dicyclohexyl-4-hydroxy-phenyl)propionic acid, esters of 3,5-di-tert-butyl-4-hydroxyphenylacetic acid with mono- or polyhydric alcohols, amides of beta-(3,5-di-tert-butyl-4-hydroxy-phenyl)propionic acid, e.g. N,N'-bis(3,5-di-tert-butyl-4-hydroxyphenylpropionyl)hexamethylenediamine, vitamin E (tocopherol), and derivatives.

An example of the amount which may be used of the antioxidants is from 0.01 to 10 parts by weight, advantageously from 0.1 to 10 parts by weight, and in particular from 0.1 to 5 parts by weight, based on 100 parts by weight of PVC.

UV Absorbers and Light Stabilizers

Examples of these are: 2-(2'-hydroxyphenyl)benzo-triazoles, such as 2-(2'-hydroxy-5'-methylphenyl)-benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-di-tert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl) sebacate, bis(2,2,6,6-tetramethylpiperidin-4-yl) succinate.

Blowing Agents

Examples of blowing agents are organic azo compounds and organic hydrazo compounds, tetrazoles, oxazines, isatoic anhydride, and also soda and sodium bicarbonate. Preference is given to azodicarbonamide and sodium bicarbonate and also mixtures of these.

Definitions and examples of impact modifiers and processing aids, gelling agents, antistats, biocides, metal deactivators, optical brighteners, flame retardants, antifogging agents, and compatibilizers, are described in "Kunststoffadditive" ["Plastics Additives"], R. Gächter/H. Müller, Carl Hanser Verlag, 3rd edn., 1989, "Plastics Additives Handbook" H. Zweifel, Carl Hanser Verlag, 5th edn., 2001 and in "Handbook of Polyvinyl Chloride Formulating" E. J. Wilson, J. Wiley & Sons, 1993, and also in "Plastics Additives" G. Pritchard, Chapman & Hall, London, 1st edition, 1998.

Impact modifiers are also described in detail in "Impact Modifiers for PVC", J. T. Lutz/D. L. Dunkelberger, John Wiley & Sons, 1992.

The invention further provides compositions which comprise a chlorine-containing polymer and comprise an inventive stabilizer mixture.

The amount used of the compounds of the general formulae (I) in these compositions, in order to achieve stabilization in the chlorine-containing polymer, is advantageously from 0.01 to 10 parts by weight, preferably from 0.05 to 5 parts by weight, in particular from 0.1 to 2 parts by weight, based on 100 parts by weight of PVC.

The amount used of the compounds of the general formulae (II) in these compositions, in order to achieve stabilization in the chlorine-containing polymer, is advantageously from 0.01 to 10 parts by weight, preferably from 0.05 to 5 parts by weight, in particular from 0.1 to 2 parts by weight, based on 100 parts by weight of PVC.

The amount used of the compounds of the general formulae (III) in these compositions, in order to achieve stabilization in the chlorine containing polymer, is advantageously from 0.01 to 10 parts by weight, preferably from 0.05 to 5 parts by weight, in particular from 0.1 to 2 parts by weight, based on 100 parts by weight of PVC.

An example of the amount which may be used of the perchlorate salt is from 0.001 to 5 parts by weight, advantageously from 0.01 to 3 parts by weight, particularly preferably from 0.01 to 2 parts by weight, based on 100 parts by weight of PVC.

Examples of the chlorine-containing polymers to be stabilized are:

polymers of vinyl chloride, of vinylidene chloride, vinyl resins whose structure contains vinyl chloride units, such as copolymers of vinyl chloride and vinyl esters of aliphatic acids, in particular vinyl acetate, copolymers of vinyl chloride with esters of acrylic or methacrylic acid and with acrylonitrile, copolymers of vinyl chloride with diene compounds and with unsaturated dicarboxylic acids or anhydrides of these, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, such as dichlorostyrene; chlorinated rubbers; chlorinated polymers of ethylene; polymers and postchlorinated polymers of chlorobutadiene and copolymers of these with vinyl chloride, chlorinated natural or synthetic rubbers, and also mixtures of the polymers mentioned with themselves or with other polymerizable compounds. For the purposes of this invention, PVC includes copolymers with polymerizable compounds, such as acrylonitrile, vinyl acetate or ABS, where these may be suspension polymers, bulk polymers or else emulsion polymers. Preference is given to a PVC homopolymer, also in combination with polyacrylates.

Other possible polymers are graft polymers of PVC with EVA, ABS or MBS. Other preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM or with polylactones, in particular from the group consisting of ABS, NBR, NAR, SAN and EVA. The abbreviations used for the copolymers are familiar to the skilled worker and have the following meanings: ABS: acrylonitrile-butadiene-styrene; SAN: styrene-acrylonitrile; NBR: acrylonitrile-butadiene; NAR: acrylonitrile-acrylate; EVA: ethylene-vinyl acetate. Other possible polymers are in particular styrene-acrylonitrile copolymers based on acrylate (ASA). A preferred component in this context is a polymer composition which comprises, as components (i) and (ii), a mixture of 25-75% by weight of PVC and 75-25% by weight of the copolymers mentioned. Components of particular importance are compositions made from (i) 100 parts by weight of PVC and (ii) 0-300 parts by weight of ABS and/or SAN-modified ABS and 0-80 parts by weight of the copolymers NBR, NAR and/or EVA, but in particular EVA. For the purposes of the present invention it is also possible to stabilize in particular recycled materials of chlorine-containing polymers, specifically the polymers described in more detail above, which have been degraded by processing, use or storage. Recycled material from PVC is particularly preferred.

The compounds which may be used concomitantly according to the invention, and also the chlorine-containing polymers, are well known to the skilled worker and are described in detail in "Kunststoffadditive" ["Plastics Additives"], R. Gächter/H. Müller, Carl Hanser Verlag, 3rd edn., 1989; in DE 197 41 778 and in EP-A 99 105 418.0 of 03.17.1999, which are incorporated herein by way of reference.

The inventive stabilizer system for chlorine-containing polymer compositions is represented by non-plasticized or plasticizer-free, or substantially plasticizer-free compositions.

The inventive compositions are particularly suitable in the form of unplasticized formulations for hollow articles (bottles), packaging foils (thermoforming foils), blown foils, crash-pad foils (automobiles), pipes, foams, heavy profiles (window frames), thin-wall profiles, construction profiles, external cladding, fittings, office foils, and apparatus casings (computers, household devices). Preferred other compositions in the form of plasticized formulations are suitable for wire sheathing, cable insulation, decorative foils, roof sheeting, foams, agricultural sheeting, hoses, sealing profiles, office foils, and sheeting for air-supported structures.

Examples of use of the inventive compositions in the form of plastisols are synthetic leather, flooring, textile coatings, wallcoverings, metal coatings (coil coatings), and underbody protection for motor vehicles. Examples of sintered-PVC uses of the inventive compositions are slush, metal coatings and coil coatings, and Luvitherm foils in the EPVC sector.

The stabilizers may advantageously be incorporated by the following methods: in the form of an emulsion or disperesoin (an example of a possibile form being that of a paste-like mixture, and an advantage of the inventive combination in that supply form being the stability of the paste); in the form of a dry mixture during the mixing of added components or polymer mixtures; via direct addition to the processing apparatus (e.g. calender, mixer, kneader, extruder, or the like), or in the form of a solution or melt or flakes or granules/pellets in dust-free form in the form of a one-pack system.

The inventive stabilized PVC likewise provided by the invention can be prepared in a manner known per se, and to this end the inventive stabilizer mixture and, if appropriate, other additives are mixed with the PVC, using apparatus known per se, such as the above-mentioned processing apparatus. The stabilizers here can be added individually or in a mixture, or else in the form of what are known as masterbatches.

The PVC stabilized by the present invention may be converted to the desired form by known methods. Examples of these processes are milling, calendering, extrusion, injection molding, or spinning, or else extrusion blow molding. The stabilized PVC can also be processed to give foams.

By way of example, a PVC stabilized according to the invention is particularly suitable for hollow articles (bottles), packaging foils (thermoforming foils), blown foils, pipes, foams, heavy profiles (window frames), thin-wall profiles, construction profiles, external cladding, fittings, office foils, and apparatus casings (computers, household devices).

The inventive PVC is particularly suitable for semi-rigid and plasticized formulations, in particular in the form of plasticized formulations for wire sheathing, or cable insulation, which is particularly preferred. In the form of semi-rigid formulations, the inventive PVC is particularly suitable for decorative foils, foams, agricultural sheeting, hoses, sealing profiles, and office foils.

Examples of use of the inventive PVC in the form of plastisol are synthetic leather, flooring, textile coatings, wall, coverings, metal coatings coil coatings and underbody protection for motor vehicles.

Examples of sintered-PVC uses of the PVC stabilized according to the invention are slush coatings and coil coatings for plastisol formulations, for semirigid formulations, and for plasticized formulations. For further details in this connection, see "Kunststoffhandbuch PVC" [Plastics handbook PVC], vol. 2/2, W. Becker/H. Braun, 2nd edn., 1985, Carl Hanser Verlag, pages 1236-1277.

The examples below illustrate the invention but do not restrict the same. As in the rest of the description, data relating to parts and percentages are based on weight.

EXAMPLES

The composition of test formulations as in the tables is given below. The data are in parts by weight, based on 100 parts of PVC resin.

A laboratory extruder was used to extrude strips in accordance with the formulations, starting from the respective dry mixtures. To produce the strips, the PVC powder mixtures and the additives mentioned were prepared by the conventional hot/cold mixing technique and homogenized and plastified in a twin-screw extruder.

The extrusion parameters are ads follows: Weber CE-3, conical twin screw: screw rotation rate 13 rpm, temperature control in individual zones: barrel section in zone 1: 170° C., zone 2 at 165° C., zone 3 at 170° C., and zone 4 at 180° C. The die temperature was adjusted to 190° C. Die geometry: 50×2 mm.

Initial color was determined as yellowness index (YI) to ASTM D1925-70. The results are given in the tables below. Low YI values mean good stabilization.

Long-term stability was further determined via determination of thermal stability to DIN VDE 0472. Here, the test piece was heated to 200° C. in a glass tube in an oil bath, the bottom of which had been sealed by fusion (AR glass from Peco-Laborbedarf GmbH, Darmstadt), and the time at which visible red coloration of the universal pH indicator paper was observed (corresponding to pH of 3) was determined.

The stability of the PVC was further determined via the dehydrochlorination test (DHC test), carried out by a method based on DIN 53381, sheet 3. Here, the time required for the dehydrochlorination curve to rise to a conductivity of 200 µS/cm was measured at 180° C.

Example 1

|  | A 1 | A 2 | A 3 | A 4 | A 5 | A 6 | A 7 |
|---|---|---|---|---|---|---|---|
| PVC (Shin Etsu 6704) | 100 | 100 | 100 | 100 | 100 | 100 | 100 |
| Compound 1 | — | — | — | — | — | — | 0.1 |
| Zeolite A | 1.0 | 1.0 | 1.0 | 1.0 | 1.0 | 1.0 | 1.0 |
| Calcium stearate | 0.4 | 0.4 | 0.4 | 0.4 | 0.4 | 0.4 | 0.4 |
| Marklube 367 | 0.6 | 0.6 | 0.6 | 0.6 | 0.6 | 0.6 | 0.6 |
| Licowax PE 520 | 0.6 | 0.6 | 0.6 | 0.6 | 0.6 | 0.6 | 0.6 |
| AC 629 A | 0.1 | 0.1 | 0.1 | 0.1 | 0.1 | 0.1 | 0.1 |
| 1,3-Dimethyl-4-aminouracil | — | 0.1 | 0.2 | — | — | 0.1 | 0.1 |
| TEA | — | — | — | 0.1 | 0.2 | 0.1 | 0.1 |
| Test results Color measurement |  |  |  |  |  |  |  |
| Yellowness Index extruded strip/ initial color | red-violet | 31 | 26 | 73 | 73 | 27 | 23 |

PVC Shin Etsu 6704, K value 67 (ex Shin Etsu)
Compound 1 = mixture composed of 9% NaClO$_4$, 45% CaCO$_3$, 40% CaSiO$_3$, 6% H$_2$O
Marklube 367 = paraffin wax (ex Crompton)
Licowax PE 520 = polyethylene wax (ex Clariant)
AC 629 A = oxidized polyethylene wax (ex Honeywell)
TEA = triethanolamine in the form of commercially available product
1,3-dimethyl-4-aminouracil in the form of commercially available product From the table it can be seen that the inventive composition A6 has surprising stabilizer action when compared with the comparative mixtures. This clearly meets an objective of this invention, improvement of initial color. For assessment of processing properties, the initial color of the test specimen is especially important for providing sufficient processing stability. Even small differences in the YI value here are relevant. The particular effect of a combination of compounds of the structure (I) with compounds of the structure (II) is seen to be significant here. The compound of the formula (I), used alone, does not have a satisfactory effect on the initial color of the PVC, as shown by the comparative examples A 4 and A 5. Synergistic action is only released in combination with a compound of formula (II), as shown in example A6. It can also be seen that the stabilization of the polymer via use of alkanolamines in combination with uracils can be still further raised via addition of perchlorates, as stated in inventive example A7.

Example 2

|  | A 4 | A 5 | B 1 | B 2 | B 3 |
|---|---|---|---|---|---|
| PVC (Shin Etsu 6704) | 100 | 100 | 100 | 100 | 100 |
| Compound 1 | — | — | — | — | — |
| Zeolite A | 1.0 | 1.0 | 1.0 | 1.0 | 1.0 |
| Calcium stearate | 0.4 | 0.4 | 0.4 | 0.4 | 0.4 |
| Marklube 367 | 0.6 | 0.6 | 0.6 | 0.6 | 0.6 |
| Licowax PE 520 | 0.6 | 0.6 | 0.6 | 0.6 | 0.6 |
| AC 629 A | 0.1 | 0.1 | 0.1 | 0.1 | 0.1 |
| N,N'-Dimethyl-N-cyanoacetylurea | — | — | 0.1 | 0.2 | 0.1 |
| TEA | 0.1 | 0.2 | — | — | 0.1 |
| Test results Color measurement |  |  |  |  |  |
| Yellowness Index extruded strip/ initial color | 73 | 73 | 36 | 30 | 28 |

PVC Shin Etsu 6704, K value 67 (ex Shin Etsu)
Compound 1 = mixture composed of 9% NaClO$_4$, 45% CaCO$_3$, 40% CaSiO$_3$, 6% H$_2$O
Marklube 367 = paraffin wax (ex Crompton)
Licowax PE 520 = polyethylene wax (ex Clariant)
AC 629 A = oxidized polyethylene wax (ex Honeywell)
TEA = triethanolamine in the form of commercially available product From the table it can be seen that the inventive composition B3 has improved stabilizer action when compared with the comparative mixtures. This clearly meets an objective of this invention, improvement of initial color. For assessment of processing properties, the range of initial color of the test specimen is especially important. The particular effect of a combination of compounds of the structure (I) with compounds of the structure (III) is seen to be significant here.

Example 3/1

The following formulations were roll-milled at 180° C. for 5 minutes on mixing rolls. The milled sheet formed was used to produce a pressed sheet at 180° C. in a preheated multi-daylight sheet press. Pressed sheet thickness: 1 mm, press time: 1 minute. Yellowness index was determined to ASTM D1925-70. Low YI values mean good stabilization and, respectively, initial color. High percentages mean good transparency.

|  | C 1 | C 2 | C 3 | C 4 | C 5 | C 6 | C 7 |
|---|---|---|---|---|---|---|---|
| Evipol SH 5730 | 100 | 100 | 100 | 100 | 100 | 100 | 100 |
| Paraloid$_{BTA\ III/N2}$ | 5 | 5 | 5 | 5 | 5 | 5 | 5 |
| Paraloid K 120N | 0.5 | 0.5 | 0.5 | 0.5 | 0.5 | 0.5 | 0.5 |
| Paraloid K 175 | 0.5 | 0.5 | 0.5 | 0.5 | 0.5 | 0.5 | 0.5 |
| E wax | 0.3 | 0.3 | 0.3 | 0.3 | 0.3 | 0.3 | 0.3 |
| Loxiol G 16 | 1.0 | 1.0 | 1.0 | 1.0 | 1.0 | 1.0 | 1.0 |
| Epox. soybean oil | 3.0 | 3.0 | 3.0 | 3.0 | 3.0 | 3.0 | 3.0 |
| NaP/H$_2$O | 0.6 | 0.6 | 0.6 | 0.6 | 0.6 | 0.6 | 0.6 |
| TEA | 0.2 | 0.4 | — | — | 0.2 | 0.2 | 0.2 |
| 1,3-Dioctyl-4-aminouracil | — | — | 0.1 | 0.3 | 0.1 | 0.2 | 0.2 |
| Mark CH 300 |  |  |  |  |  |  | 0.5 |

-continued

|  | C 1 | C 2 | C 3 | C 4 | C 5 | C 6 | C 7 |
|---|---|---|---|---|---|---|---|
| Color measurement on 1 mm pressed sheets |  |  |  |  |  |  |  |
| Yellowness Index YI | 43.8 | 36.1 | 83.1 | 54.4 | 24.4 | 18.4 | 14.8 |
| Transparency | 90.5 | 91.1 | 78.0 | 89.9 | 92.3 | 93.1 | 92.9 |

Evipol SH 5730 PVC, K value 57 (ex EVC)
Paraloid K 175/K 120N = acrylate processing aid (ex Rohm & Haas)
Paraloid BTA III/N2 = methacrylate-butadiene-styrene modifier (ex Rohm & Haas)
E wax = ester wax/montan wax (ex Clariant)
Loxiol G 16 = fatty acid partial ester (ex Henkel)
NaP/H$_2$O = 30% strength sodium perchlorate solution in water
Mark CH 300 = mixed aryl/alkyl phosphite (ex Crompton)
TEA = triethanolamine in the form of commercially available product From the table it can be seen that the inventive composition C 5 provides an improvement in stabilizer action when compared with the comparative mixtures. It can also be seen that stabilization of the polymer via use of alkanolamines in combination with uracils can be still further raised via addition of phosphites, as stated in inventive example C 7.

Example 3/2

The formulations were roll-milled at 180° C. for 5 minutes on mixing rolls. The milled sheet formed was used to produce a pressed sheet at 180° C. in a preheated multi-daylight sheet press. Pressed sheet thickness: 1 mm, press time: 1 minute. Yellowness index was determined to ASTM D1925-70. Low YI values mean good stabilization and, respectively, initial color. High percentages mean good transparency.

|  | C 1 | C 2 | C 8 | C 9 | C 10 | C 11 | C 12 |
|---|---|---|---|---|---|---|---|
| Evipol SH 5730 PVC | 100 | 100 | 100 | 100 | 100 | 100 | 100 |
| Paraloid BTA III/N2 | 5 | 5 | 5 | 5 | 5 | 5 | 5 |
| Paraloid K 120N | 0.5 | 0.5 | 0.5 | 0.5 | 0.5 | 0.5 | 0.5 |
| Paraloid K 175 | 0.5 | 0.5 | 0.5 | 0.5 | 0.5 | 0.5 | 0.5 |
| E wax | 0.3 | 0.3 | 0.3 | 0.3 | 0.3 | 0.3 | 0.3 |
| Loxiol G 16 | 1.0 | 1.0 | 1.0 | 1.0 | 1.0 | 1.0 | 1.0 |
| Epox. soybean oil | 3.0 | 3.0 | 3.0 | 3.0 | 3.0 | 3.0 | 3.0 |

-continued

|  | C 1 | C 2 | C 8 | C 9 | C 10 | C 11 | C 12 |
|---|---|---|---|---|---|---|---|
| NaP/H$_2$O | 0.6 | 0.6 | 0.6 | 0.6 | 0.6 | 0.6 | 0.6 |
| TEA | 0.2 | 0.4 | — | — | 0.2 | 0.2 | 0.2 |
| 1,3-Dimethyl-4-aminouracil | — | — | 0.1 | 0.3 | 0.1 | 0.2 | 0.2 |
| Phosphite Mark CH 300 |  |  |  |  |  |  | 0.5 |
| Color measurement on 1 mm pressed sheets |  |  |  |  |  |  |  |
| Yellowness Index YI | 43.8 | 36.1 | 55.7 | 24.1 | 16.3 | 14.2 | 11.6 |
| Transparency | 90.5 | 91.1 | 88.8 | 91.1 | 92.8 | 92.5 | 92.6 |

Evipol SH 5730 PVC, K value 57 (ex EVC)
Paraloid K175/K 120N = acrylate processing aid (ex Rohm & Haas)
Paraloid BTA III/N2 = methacrylate-butadiene-styrene modifier (ex Rohm & Haas)
E wax = ester wax/montan wax (ex Clariant)
Loxiol G 16 = fatty acid partial ester of glycerol (ex Henkel)
NaP/H$_2$O = 30% strength sodium perchlorate solution in water
Phosphite Mark CH 300 = mixed aryl/alkyl phosphite (ex Crompton)
TEA = triethanolamine in the form of commercially available product From the table it can be seen that the inventive compositions C 10 and C 11 provide an improvement in stabilizer action when compared with the comparative mixtures. It can also be seen that stabilization of the polymer via use of alkanolamines in combination with uracils can be still further raised via addition of phosphites, as stated in inventive example C 12.

Example 4

The following formulations were roll-milled at 180° C. for 5 minutes on mixing rolls. The milled sheet formed was used to produce a pressed sheet at 180° C. in a preheated multi-daylight sheet press. Pressed sheet thickness: 1 mm, press time: 1 minute. Yellowness index was determined to ASTM D1925-70. Low YI values mean good stabilization and, respectively, initial color. High percentages mean good transparency. The Congo Red value was determined at 200° C. to DIN 473/811/3/2. High minute values mean good thermal stability of the test specimen. The time taken to reach conductivity of 200 μS/cm was measured. The higher the value from this dehydrochlorination test (DHC), the better the stabilization.

|  | D 1 | D 2 | D 3 | D 4 | D 5 | D 6 | D 7 | D 8 |
|---|---|---|---|---|---|---|---|---|
| PVC (Evipol SH 7020) | 100 | 100 | 100 | 100 | 100 | 100 | 100 | 100 |
| DEHP | 20 | 20 | 20 | 20 | 20 | 20 | 20 | 20 |
| Epox. soybean oil | 3.0 | 3.0 | 3.0 | 3.0 | 3.0 | 3.0 | 3.0 | 3.0 |
| NaP/BDG | 0.2 | 0.2 | 0.2 | 0.2 | 0.2 | 0.2 | 0.2 | 0.2 |
| AC 629 A | 0.2 | 0.2 | 0.2 | 0.2 | 0.2 | 0.2 | 0.2 | 0.2 |
| TEA | 0.2 | 0.4 | — | — | 0.2 | — | — | — |
| Diethanolsoyamine | — | — | — | — | — | 0.2 | 0.4 | 0.2 |
| 1,3-Dibutyl-4-aminouracil | — | — | 0.2 | 0.3 | 0.1 | — | — | 0.1 |
| Color measurement on 1 mm pressed sheets |  |  |  |  |  |  |  |  |
| Yellowness Index YI | 17.4 | 14.7 | 15.8 | 12.2 | 9.7 | 15.7 | 13.9 | 9.1 |
| Transparency | 96.7 | 95.9 | 97.3 | 97.4 | 97.3 | 97.6 | 97.6 | 98.1 |

-continued

|  | D 1 | D 2 | D 3 | D 4 | D 5 | D 6 | D 7 | D 8 |
|---|---|---|---|---|---|---|---|---|
| Congo Red | 17 | 28 | 10 | 10 | 21 | 10 | 22 | 17 |
| DHC [200 □S/cm] | 117 | 152 | 88 | 93 | 128 | 89 | 129 | 115 |

Evipol 7020 PVC, K value 70 (ex EVC)
DEHP = di-2-ethylhexyl phthalate in the form of commercially available product
NaP/BDG = 30% strength sodium perchlorate solution in butyl diglycol
TEA = triethanolamine in the form of commercially available product
Diethanolsoyamine = bis(2-hydroethyl)soyamine in the form of commercially available product
1,3-Dibutyl-4-aminourcil
AC 629 A = oxidized polyethylene wax (ex Honeywell)

From the table it can be seen that the inventive compositions D5 and D8 have improved stabilizer action when compared with the comparative mixtures.

Example 5

The formulations were roll-milled at 180° C. for 5 minutes on mixing rolls. The milled sheet formed was used to produce a pressed sheet at 180° C. in a preheated multi-daylight sheet press. Pressed sheet thickness: 1 mm, press time: 1 minute. Yellowness index was determined to ASTM D1925-70. Low YI values mean good stabilization and, respectively, initial color. High percentages mean good transparency.

|  | E 1 | E 2 | E 3 | E 4 | E 5 | E 6 | E 7 | E 8 | E 9 | E 10 | E 11 |
|---|---|---|---|---|---|---|---|---|---|---|---|
| Evipol SH 7020 PVC | 100 | 100 | 100 | 100 | 100 | 100 | 100 | 100 | 100 | 100 | 100 |
| DEHP | 47 | 47 | 47 | 47 | 47 | 47 | 47 | 47 | 47 | 47 | 47 |
| Epox. soybean oil | 3 | 3 | 3 | 3 | 3 | 3 | 3 | 3 | 3 | 3 | 3 |
| Loxiol G 71 S | 0.3 | 0.3 | 0.3 | 0.3 | 0.3 | 0.3 | 0.3 | 0.3 | 0.3 | 0.3 | 0.3 |
| Calcium stearate | 0.1 | 0.1 | 0.1 | 0.1 | 0.1 | 0.1 | 0.1 | 0.1 | 0.1 | 0.1 | 0.1 |
| NaP/BDG | — | — | — | — | — | — | — | — | 0.5 | 0.5 | 0.5 |
| 1,3-Dioctyl-4-aminouracil | — | — | 0.2 | 0.2 | — | 0.2 | — | 0.2 | 0.2 | 0.2 | 0.2 |
| TEA | — | 0.2 | — | 0.2 | — | — | — | — | 0.2 | — | — |
| Diethanolsoyamine | — | — | — | — | 0.2 | 0.2 | — | — | — | 0.2 | — |
| TIPA | — | — | — | — | — | — | 0.2 | 0.2 | — | — | 0.2 |
| Color measurement on 1 mm pressed sheets |  |  |  |  |  |  |  |  |  |  |  |
| Yellowness Index YI | 66.3 | 56.1 | 24.3 | 13.9 | 87.2 | 18.2 | 72.5 | 17.0 | 10.2 | 9.6 | 9.6 |
| b value | 21.9 | 23.4 | 14.2 | 10.7 | 23.9 | 10.7 | 30.4 | 10.1 | 5.7 | 5.6 | 5.8 |
| Transparency | 74.7 | 85.2 | 97.5 | 97.8 | 66.4 | 97.8 | 84.6 | 97.9 | 96.5 | 96.8 | 97.6 |

Evipol SH 7020 PVC, K value 70 (ex EVC)
DEHP = di-2-ethylhexyl phthalate in the form of commercially available product
NaP/BDG = 30% strength sodium perchlorate solution in butyl diglycol
Loxiol G 71 S = multicomponent ester lubricant (ex Henkel)
TEA = triethanolamine in the form of commercially available product
Diethanolsoyamine = ES-2 in the form of commercially availble product
TIPA = triisopropanolamine in the form of commercially availble product From the table it can be seen that the inventive compositions E4, E6, and E8 provide an improvement in stabilizer action when compared with the comparative mixtures. It can also be seen that stabilization of the polymer can be still further raised via addition of perchlorate, as stated in inventive examples E9, E10, and E11.

What is claimed is:

1. A stabilizer mixture for stabilizing chlorine-containing polymers, comprising at least
   a) one alkanolamine of the following formula (I), and
   b) one uracil of the following formula (II),
   wherein, for the alkanolamine of the formula (I)

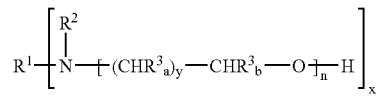

$x = 1, 2$ or $3$;
$y = 1, 2, 3, 4, 5$ or $6$;
$n = $ from $1$ to $10$;
$R^1$ and $R^2 = $ independently of one another H, $C_1$-$C_{22}$-alkyl,
—[—$(CHR^3{}_a)_y$—$CHR^3{}_b$—O—]$_n$—H,
[—$(CHR^3{}_a)_y$—$CHR^3{}_b$—O—]$_n$—CO—$R^4$, $C_2$-$C_{20}$- alkenyl, $C_2$-$C_{18}$-acyl, $C_4$-$C_8$-cycloalkyl, where this may have OH substitution in the β-position, $C_6$-$C_{10}$-aryl, $C_7$-$C_{10}$-alkaryl or $C_7$-$C_{10}$-aralkyl, or, if x=1, $R^1$ and $R^2$ may also, together with the N, form a closed ring having from 4 to 10 members, comprising carbon atoms and, optionally, up to 2 heteroatoms, or if x=2, $R^1$ may also be $C_2$-$C_{18}$-alkylene which, at both β-carbon atoms, may have OH substitution and/or have interruption by one or more O atoms and/or by one or more $NR^2$ groups, or be dihydroxy-substituted tetrahydrodicyclopentadienylene, dihydroxy-substituted ethylcyclohexanylene, dihydroxy-substituted 4,4'-(bisphenol A dipropyl ether)ylene, isophoronylene, dimethylcyclohexanylene, dicyclohexylmethanylene or 3,3'-dimethyldicyclohexylmethanylene, and if x=3, $R^1$ may also be trihydroxy-substituted (tri-N-propyl isocyanurate)triyl;

$R^3{}_a$ and $R^3{}_b$=independently of one another $C_1$-$C_{22}$-alkyl, $C_2$-$C_6$-alkenyl, $C_6$-$C_{10}$-aryl, H or $CH_2$—X—$R^5$, where X=O, S, —O—CO— or —CO—O—;

$R^4$=$C_1$-$C_{18}$-alkyl/alkenyl or phenyl; and $R_5$=H, $C_1$-$C_{22}$-alkyl, $C_2$-$C_{22}$-alkenyl or $C_6$-$C_{10}$-aryl;

and for the uracil of the formula (II)

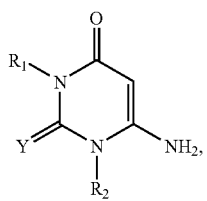

(II)

$R_1$ and $R_2$, independently of one another, are $C_1$-$C_{24}$-alkyl, which may have interruption by —$CO_2$— and/or by 1 or more oxygen atoms, and/or may have substitution by one or more OH groups, or are $C_3$-$C_{24}$-alkenyl, branched or unbranched, or are $C_5$-$C_8$-cycloalkyl, unsubstituted or substituted with from 1 to 3 $C_1$-$C_4$-alkoxy, or $C_5$-$C_8$-cycloalkyl groups, or with hydroxy groups, or with —Cl atoms, or are $C_7$-$C_9$-phenylalkyl, unsubstituted or substituted on the phenyl ring with from 1 to 3 $C_1$-$C_4$-alkyl, $C_1$-$C_4$-alkoxy, or $C_5$-$C_8$-cycloalkyl groups, or with hydroxy groups, or with —Cl atoms, and $R_1$ or $R_2$ may also be hydrogen, and Y is S or O.

2. The stabilizer mixture for stabilizing chlorine-containing polymers of claim 1, comprising at least
a) wherein the one alkanolamine of the following formula (I) is a reaction product of a mono- or polyfunctional epoxide and of ammonia or of a mono- or polyfunctional dialkyl(aryl)- or monoalkyl(aryl)amine.

3. The stabilizer mixture for stabilizing chlorine-containing polymers of claim 1, comprising at least one cyanoacetylurea of the following formula (III)

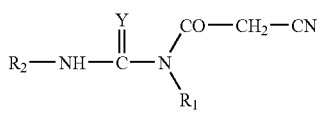

wherein
Y is oxygen or sulfur, and
$R_2$ is $C_1$-$C_{24}$-alkyl, which may have interruption by —$CO_2$— and/or by oxygen atoms, and/or may have substitution by from 1 to 3 OH groups, or is $C_3$-$C_{24}$-alkenyl, $C_7$-$C_{10}$-phenylalkyl, $C_5$-$C_8$-cycloalkyl, $C_7$-$C_{10}$-alkylphenyl, phenyl or naphthyl, and in each case the aromatic radical may have substitution by —OH, $C_1$-$C_{12}$-alkyl and/or $OC_1$-$C_4$-alkyl, and $R_1$ is as defined for $R_2$, or $R_1$ is hydrogen.

4. The stabilizer mixture for stabilizing chlorine-containing polymers of claim 3, comprising at least
wherein the one alkanolamine of the following formula (I) is a reaction product of a mono- or polyfunctional epoxide and of ammonia or of a mono- or polyfunctional dialkyl(aryl)- or monoalkyl(aryl)amine.

5. The stabilizer mixture as claimed in claim 2, wherein the polyfunctional epoxide is dicyclopentadiene diepoxide, vinylcyclohexene diepoxide, bisphenol A diglycidyl ether, or trisglycidyl isocyanurate, and the dialkylamine is diethanolamine or diisopropanolamine, and the monoalkylamine is monoethanolamine or monoisopropanolamine.

6. The stabilizer mixture as claimed in claim 1, wherein, in the compound with the general formula (I), $R^3{}_a$ and $R^3{}_b$, independently of one another, are H or $CH_3$ and y=1.

7. The stabilizer mixture as claimed in claim 1, wherein, in the compound with the general formula (I), $R^1$=$R^2$=$CH^2$-$CHR^3{}_b$—OH.

8. The stabilizer mixture as claimed in claim 1, wherein the compounds of the general formula (I) are tris(2-hydroxy-1-propyl)amine, tris(2-hydroxyethyl)amine, bis(2-hydroxyethyl)-2-hydroxy-1-propyl)amine, or alkyl/alkenyl-bis(2-hydroxyethyl)amine, alkyl/alkenyl(2-hydroxy-1-propyl)amine, N-(2-hydroxyhexadecyl)diethanolamine, N-(2-hydroxy-3-octyloxypropyl)diethanolamine, N-(2-hydroxy-3-decyloxypropyl)diethanol-amine, or a mixture thereof.

9. The stabilizer mixture for stabilizing chlorine-containing polymers, as claimed in claim 1, also comprising at least one perchlorate salt.

10. The stabilizer mixture as claimed in claim 1, wherein the perchlorate salt is a compound of the formula $M(ClO_4)_n$, wherein M is Li, Na, K, Mg, Ca, Sr, Ba, Zn, Al, La, Ce, or a hydrotalcite layer-lattice cation, or an organic onium cation; n is 1, 2 or 3, as appropriate for the valency of M, or if a hydrotalcite layer-lattice cation is present $0 < n \leq 1$.

11. The stabilizer mixture as claimed in claim 1, wherein, in the perchlorate salt, M=Na or K, and n=1.

12. The stabilizer mixture as claimed in claim 1, also comprising an anhydrous hydrotalcite or a zeolite.

13. The stabilizer mixture as claimed in claim 1, which also comprises metal soaps, and/or comprises another substance from the group of the polyols and disaccharide alcohols, salts of the hydroxycarboxylic acids, glycidyl compounds, hydrotalcites, aluminosilicates of alkali metals or of alkaline earth metals, hydroxides/oxides of alkali metals or of alkaline earth metals, or the corresponding (hydrogen)carbonates or carboxylates, and fillers/pigments, plasticizers, antioxidants, light stabilizers, optical brighteners, lubricants and epoxidized fatty acid esters.

14. The stabilizer mixture as claimed in claim 1, where one of a phosphate, reaction products of phosphite with the component of formula (I) or with the perchlorate salt, and combinations thereof.

15. The stabilizer mixture as claimed in claim 14, where the additional phosphite is distearyl pentaerythrityl diphosphite, triphenyl phosphite, trisnonyiphenyl phosphite, phenyl didecyl phosphite, poly(dipropylene glycol) phenyl phosphite, tetraphenyl dipropylene glycol diphosphite, tetraisodecyl dipropylene glycol diphosphite, trisdipropylene glycol phosphite, decyl diphenyl phosphite, trioctyl phosphite, trilauryl phosphite or nonylphenyl$_{1.5}$ C$_{12}$/C$_{13}$-alkyl$_{1.5}$ phosphite.

16. A composition, comprising a chlorine-containing polymer and the stabilizer mixture as claimed in claim 1.

17. The composition as claimed in claim 1, wherein it comprises, based on 100 parts by weight of chlorine-containing polymer, from 0.01 to 10 parts by weight of the compound of the general formula (I) and from 0.01 to 10 parts by weight of the compound of the general formula (II).

18. The composition as claimed in claim 3, wherein it comprises, based on 100 parts by weight of chlorine-containing polymer, from 0.01 to 10 parts by weight of the compound of the general formula (I) and from 0.01 to 10 parts by weight of the compound of the general formula (III).

19. The composition as claimed in claim 17, wherein it also comprises, based on 100 parts by weight of chlorine-containing polymer, from 0.001 to 5 parts by weight of a perchlorate salt.

20. The composition as claimed in claim 19, wherein it also comprises, based on 100 parts by weight of chlorine-containing polymer, from 0.05 to 5 parts by weight of a phosphite.

21. A process for stabilizing chlorine-containing polymers via addition of the stabilizer mixture as claimed in claim 1, to a chlorine-containing polymer.

22. The process for stabilizing chlorine-containing polymers as claimed in claim 21, wherein the chlorine-containing polymer is plasticized PVC.

23. The process for stabilizing chlorine-containing polymers as claimed in claim 21, wherein the plasticized PVC serves for production of floorcoverings, motor vehicle components, plasticized foils, hoses, injection moldings, or wire sheathing.

24. The process for stabilizing chlorine-containing polymers as claimed in claim 21, wherein the chlorine-containing polymer is unplasticized PVC.

25. The process for stabilizing chlorine-containing polymers as claimed in claim 21, wherein the chlorine-containing polymer serves for production of foils, or of PVC pipes, or of profiles.

26. A consumer item, comprising PVC, which has been stabilized via the stabilizer mixture as claimed in claim 1.

* * * * *